US012057624B2

(12) United States Patent
Ramesh Kumar et al.

(10) Patent No.: US 12,057,624 B2
(45) Date of Patent: Aug. 6, 2024

(54) VEHICLE PANE

(71) Applicant: SAINT-GOBAIN GLASS FRANCE, Courbevoie (FR)

(72) Inventors: Varun Ramesh Kumar, Aachen (DE); Guillaume Francois, Aachen (DE); Thomas Holtstiege, Schwelm (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 339 days.

(21) Appl. No.: 17/608,348

(22) PCT Filed: Apr. 23, 2020

(86) PCT No.: PCT/EP2020/061298
§ 371 (c)(1),
(2) Date: Nov. 2, 2021

(87) PCT Pub. No.: WO2020/224973
PCT Pub. Date: Nov. 12, 2020

(65) Prior Publication Data

US 2022/0231405 A1 Jul. 21, 2022

(30) Foreign Application Priority Data

May 8, 2019 (EP) .................................... 19173249

(51) Int. Cl.
*H01Q 1/32* (2006.01)
*H01Q 1/12* (2006.01)

(52) U.S. Cl.
CPC .......... *H01Q 1/325* (2013.01); *H01Q 1/1271* (2013.01); *H01Q 1/3208* (2013.01)

(58) Field of Classification Search
CPC ..... H01Q 1/3208; H01Q 1/325; H01Q 1/1271
See application file for complete search history.

(56) References Cited

U.S. PATENT DOCUMENTS

| | | | |
|---|---|---|---|
| 5,499,444 | A | 3/1996 | Doane, Jr. et al. |
| 6,100,775 | A | 8/2000 | Wen |

(Continued)

FOREIGN PATENT DOCUMENTS

| | | | |
|---|---|---|---|
| CN | 203015290 | U | 6/2013 |
| CN | 103636060 | A | 3/2014 |

(Continued)

OTHER PUBLICATIONS

International Search Report as issued in International Patent Application No. PCT/EP2020/061298, dated Jul. 14, 2020.

*Primary Examiner* — Hoang V Nguyen
*Assistant Examiner* — Amal Patel
(74) *Attorney, Agent, or Firm* — Pillsbury Winthrop Shaw Pittman LLP

(57) ABSTRACT

A vehicle pane includes a first substrate, at least one antenna structure and a connection region, wherein the antenna structure is arranged on a flexible film, wherein, additionally, a first line region is provided on the flexible film, wherein the connection region is arranged on a carrier, wherein, additionally, a second line region is provided on the carrier, wherein the flexible film has a first contact region and the carrier has a second contact region for the reciprocal connection of the first line region to the second line region, wherein the flexible film is routed around one end of the first substrate.

13 Claims, 3 Drawing Sheets

(56) References Cited

U.S. PATENT DOCUMENTS

Figure 1:
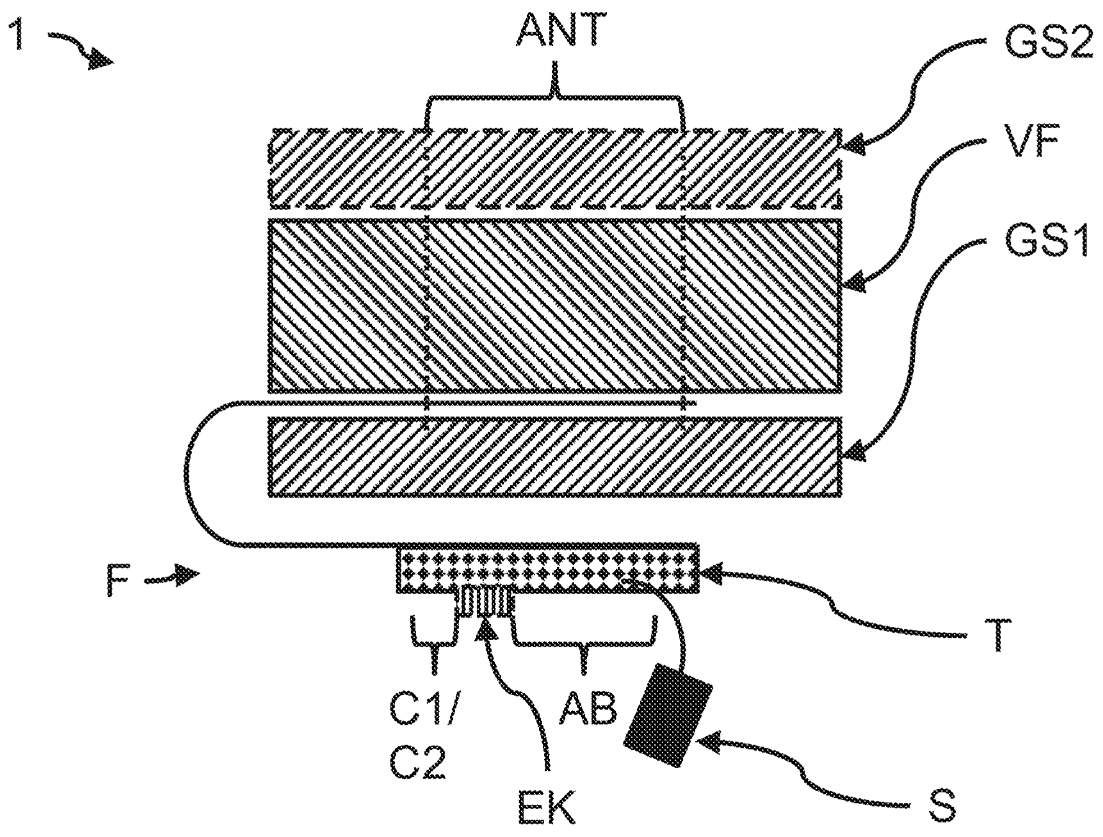

| | | | |
|---|---|---|---|
| 9,257,747 B2 | 2/2016 | Flores-Cuadras | |
| 2006/0202898 A1 | 9/2006 | Li et al. | |
| 2008/0129619 A1 | 6/2008 | Lee et al. | |
| 2011/0121924 A1* | 5/2011 | White | H01P 5/085 333/260 |
| 2013/0099981 A1 | 4/2013 | Vortmeier et al. | |
| 2014/0176374 A1 | 6/2014 | Lo | |
| 2015/0102874 A1 | 4/2015 | Chuo et al. | |
| 2018/0037006 A1* | 2/2018 | Droste | B32B 17/10183 |

FOREIGN PATENT DOCUMENTS

| | | | |
|---|---|---|---|
| CN | 106450690 | A | 2/2017 |
| CN | 106463813 | A | 2/2017 |
| CN | 107453028 | A | 12/2017 |
| DE | 43 02 139 | C1 | 3/1994 |
| DE | 20 2006 011919 | U1 | 10/2006 |
| DE | 20 2010 011837 | U1 | 5/2011 |
| JP | 2014-179858 | A | 9/2014 |
| JP | 2018-513638 | A | 5/2018 |
| KR | 10-2008-0029054 | A | 4/2008 |
| WO | WO 00/22695 | A1 | 4/2000 |
| WO | WO 2005/091827 | A2 | 10/2005 |

* cited by examiner

VEHICLE PANE

CROSS-REFERENCE TO RELATED APPLICATIONS

This application is the U.S. National Stage of PCT/EP2020/061298, filed Apr. 23, 2020, which in turn claims priority to European patent application number 191 73249.4 filed May 8, 2019. The content of these applications are incorporated herein by reference in their entireties.

Vehicles are increasingly equipped with electrical components. In addition to the classic radio devices, there is an increasing number of devices in a vehicle that can receive or even transmit high-frequency signals.

Mentioned here, by way of example, is the reception of signals of a navigation system but also signals from communications systems.

Navigation systems can be, for example, a satellite-based navigation satellite system (GNSS). Systems in operation include, for example, the Global Positioning System (GPS) or the Global Navigation Satellite System (GLONASS). Other navigation systems are possible, for example, based on mobile communication systems.

Communication systems can, for example, be short-range radio systems for car-to-car or car-to-infrastructure or also mobile communication systems, e.g., 2G, 3G, 4G, or 5G mobile communication systems.

Although corresponding antennas can be secured to the outside of a vehicle, such additional equipment poses a problem in several respects.

Exemplary arrangements are known from the publication US 20140176374 A1.

For one thing, such devices require perforations that are susceptible to corrosion. For another, such devices often interfere with the visual impression. But often such devices also provide a source of noise as well as increased wind resistance. In addition, such antennas are also a target for vandalism.

Based on this, there has been a trend in the past to provide antennas at other locations.

For example, GNSS antennas can be arranged within the vehicle interior, for example, below the dashboard or below the windshield.

It is difficult to find a suitable position with a good view of the antenna to the GNSS satellites, and, at the same time, to avoid EMC problems from electrical devices in the dashboard and from the vehicle engine.

Furthermore, electrically conductive layers such as infrared reflecting layers or low-E layers can prevent the transmission of electromagnetic radiation through the window and block the GNSS signal.

Typical GPS antennas are implemented as planar antennas and typically as patch antennas and are known, for example, from WO 00/22695 A1, DE 202006011919 U1, or DE 202010011837 U1. Here, a planar metallic antenna structure is arranged on one side of a printed circuit board or a ceramic carrier. A planar base plate is arranged on the opposite side as a ground plane. The antenna structure and the base plate are connected to an electrical receiving unit via electrical lines. Due to the material thickness of the printed circuit board or the ceramic carrier, the antenna has a certain thickness and, when arranged directly on the windshield, is clearly visible and not very aesthetic.

From U.S. Pat. No. 9,257,747 B2, a Vivaldi antenna that can be attached to a vehicle pane is known. From WO2005/091827 A2, a patch antenna that can be attached to vehicle pane is known. From US 2008/0 129 619 A1, a crossed dipole antenna arrangement that can be attached to a vehicle pane is known.

Furthermore, from US patent application US 2011/121 924A1, a vehicle-pane-mounted antenna with a coaxial cable connection is known.

Until now, antennas mounted on the pane surface have been connected with a coaxial cable.

From the Japanese publication JP 2014-179 858 A, another arrangement of an antenna with a connection for arrangement on a vehicle pane is known.

The integration of antennas and supply lines in panes is desired on the basis of many considerations. On the one hand, considerations concerning positioning play a role; on the other, there are considerations regarding the electrical connection of the antennas.

At the same time, however, a sufficiently strong signal with as little noise as possible must be provided for the subsequent signal processing.

Consequently, signals are amplified prior to signal processing/decoding. However, it turns out that the attenuation on the supply lines to the amplifiers has already led to a serious weakening of the useful signals such that the amplifiers must be particularly low-noise such that the signal-to-noise ratio is only slightly degraded. However, such amplifiers are expensive.

From U.S. Pat. No. 5,499,444, a production method fora rigid circuit board with flexible parts is known. However, the circuit board thus provided is unsuitable for integration into a vehicle pane.

Likewise, from the Chinese utility model CN 203015290, an arrangement in which two rigid circuit boards are connected to a flexible circuit board is known. However, the arrangement thus provided is unsuitable for integration into a vehicle pane.

Also, from the Korean patent application KR 10-2008-0029054, an arrangement in which two rigid circuit boards are connected to a flexible printed circuit board is known. However, the arrangement thus provided is unsuitable for integration into a vehicle pane.

From the Chinese patent application CN 106450690 A1, a so-called “low-profile blanket antenna” is known. Although this is broadband, it cannot be integrated into a vehicle pane.

From the US patent application US 2015/0 102 874 A1, an expansion of a flexible printed circuit board to provide better HF decoupling is known.

Common to all the aforementioned documents is the fact that the structures made available there cannot be integrated into a vehicle pane. In addition, the structures can only be produced with considerable effort such that they do not provide a cost-effective solution.

Based on this, an object of the invention is to provide a vehicle pane in which an antenna plus a supply line can be integrated safely, reliably, and economically.

The object is accomplished by a vehicle pane with a first substrate and with at least one antenna structure and a connection region, wherein the antenna structure is arranged on a flexible film, wherein, additionally, a first line region is provided on the flexible film, wherein the connection region is arranged on a carrier, wherein, additionally, a second line region is provided on the carrier, wherein the flexible film has a first contact region and the carrier has a second contact region for the reciprocal connection of the first line region to the second line region, wherein the flexible film is routed around one end of the first substrate.

The invention enables integrating an antenna in a vehicle pane while devices for signal processing, such as filters/amplifiers are provided near the antenna on a rigid carrier. By providing suitable contact regions, the transmission can be impedance matched to the respective line regions. As a result, the signal-to-noise ratio can be largely maintained. In other words, the invention allows extensive integration along with, at the same time, an economical production method.

In one embodiment of the invention, the carrier is rigid. In other words, the invention can, for example, make use of printed circuit boards.

In another embodiment of the invention, the first contact region and the second contact region have three or more electrical contact points.

This can, for example, provide a connection for coplanar waveguides.

According to another embodiment, the first contact region and the second contact region have five or more electrical contact points.

A higher number of contact points can, for example, provide better shielding in the contact region.

According to yet another embodiment of the invention, the film and the carrier are arranged substantially overlappingly in the region of the first contact region and the second contact region.

In the overlapping region, for example, structures requiring multiple patterned conductor layers can be implemented.

In yet another embodiment of the invention, the film has a first patterned conductor layer and a second patterned conductor layer, with the first line region designed as a grounded coplanar waveguide.

In other words, by means of the invention, well-shielded, low-attenuation transmission to the contact region can be realized in a particularly simple manner.

In another embodiment of the invention, the film has at least one via.

In other words, by means of invention, relatively complex structures, e.g., waveguide structures or stripline structures, can be provided in a particularly simple manner.

According to another embodiment of the invention, the film comprises polyimide. Thus, a flexible (partial) arrangement can be provided in a particularly simple manner.

According to yet another embodiment of the invention, the carrier comprises FR4. Thus, a rigid (partial) arrangement can be provided in a particularly simple manner.

In yet another embodiment, the carrier has at least one via.

In other words, by means of the invention, relatively complex structures, e.g., waveguide structures or stripline structures can be provided in a particularly simple manner.

According to another embodiment of the invention, a vehicle, in particular a land, water, air, or space craft, is provided with a glass pane according to the invention.

According to yet another embodiment of the invention, the glass pane according to the invention is used to receive signals for satellite-based navigation, in particular to receive GNSS signals of Navstar GPS, Galileo, GLONASS, BeiDou, NaviC, QZSS. Alternatively or additionally, the glass pane according to the invention is used to receive signals of a mobile communication system, in particular of a 2G, 3G, 4G, or 5G mobile communication systems.

Without loss of generality, the vehicle pane can be a windshield, a rear window, a side window, or a roof panel.

The invention is explained in greater detail in the following with reference to drawings and exemplary embodiments. The drawings are schematic representations and not to scale. The drawings in no way restrict the invention.

Figure 2:
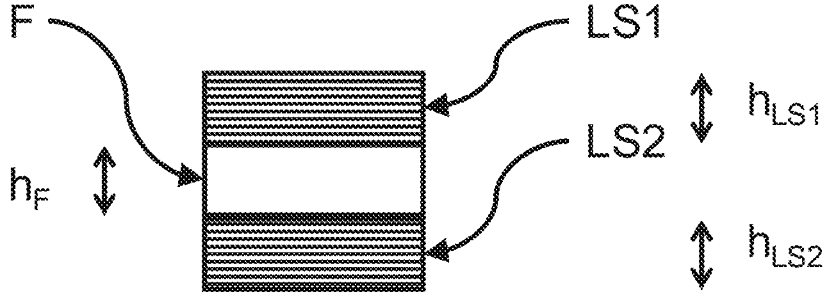
Figure 3:
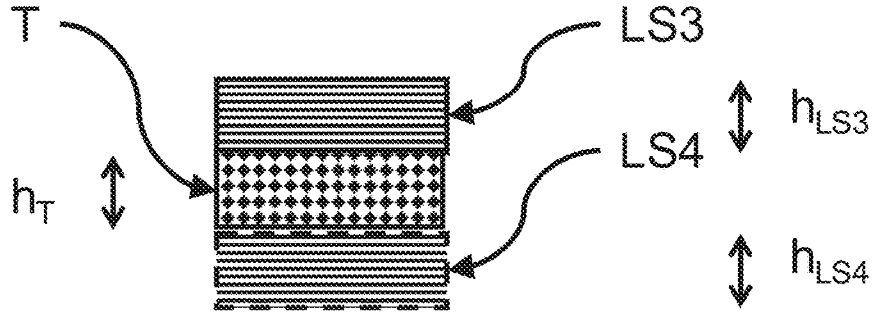
Figure 4:
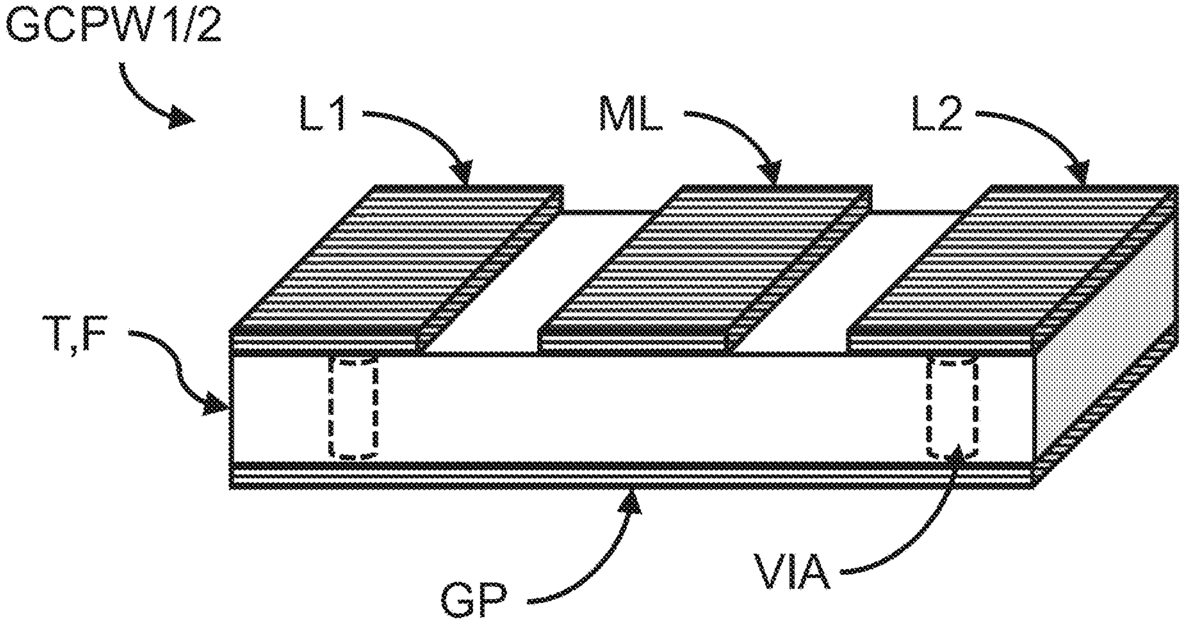
Figure 5:
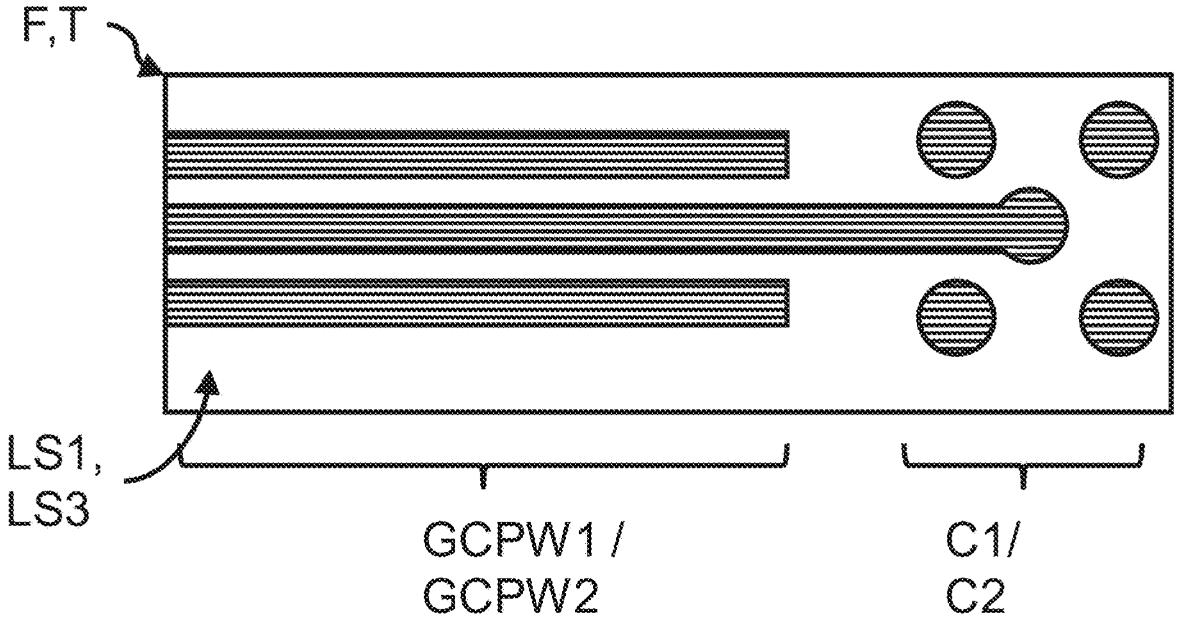
Figure 6:
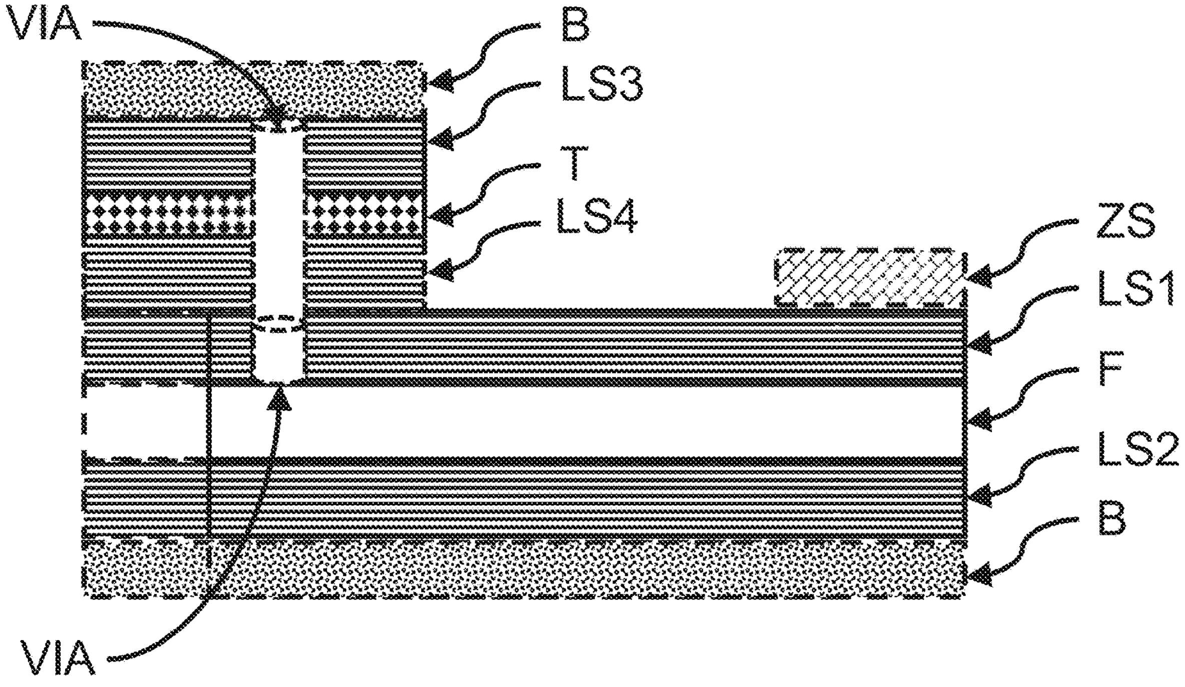

They depict:

FIG. 1 a schematic overview relative to the arrangement of films, glass layer(s), to clarify aspects according to prior art and the invention, FIG. 2 a schematic sectional view through embodiments of a film according to embodiments of the invention, FIG. 3 a schematic sectional view through embodiments of a carrier according to embodiments of the invention, FIG. 4 a schematic perspective view of line regions according to embodiments of the invention, FIG. 5 a schematic perspective view of contact regions according to embodiments of the invention, and FIG. 6 a schematic sectional view through embodiments of a carrier and a film according to embodiments of the invention In the following, the invention will be presented in more detail with reference to the figures. It should be noted that different aspects that can be used individually or in combination are described. In other words, any aspect can be used with different embodiments of the invention unless explicitly presented as a pure alternative.

Furthermore, in the following, for the sake of simplicity, reference is generally made to only one entity. However, unless explicitly noted, the invention can also have several of the entities in question. Thus, the use of the words "a" and "an" is to be understood only as an indication that at least one entity is used in a simple embodiment.

Insofar as processes are described in the following, the individual steps can be arranged in any order and/or combined, unless the context explicitly indicates otherwise. Furthermore, the processes can be combined with one another—unless expressly indicated otherwise.

Indications with numerical values are generally not to be understood as exact values, but also include a tolerance from ±1% up to ±10%.

Insofar as standards, specifications, or the like are mentioned in this application, at least the standards, specifications, or the like applicable on the filing date are always referred to. I.e., if a standard/specification, etc. is updated or replaced by a successor, the invention is also applicable thereto.

Various embodiments are depicted in the figures.

According to embodiments of the invention, a vehicle pane 1 with a first substrate GS1 and with at least one antenna structure ANT and a connection region AB is provided.

The antenna structure ANT is arranged on a flexible film F. Moreover, a first line region GCPW1 is provided on the flexible film F.

The flexible (dielectric) film F can comprise at least one material selected from the group consisting of polyimide, polyurethane, polymethyl methacrylic acid, polycarbonate, polyethylene terephthalate, polyvinyl butyral, FR6, acrylonitrile-butadiene-styrene copolymer, polyethylene, polypropylene, polyvinyl chloride, polystyrene, polybutylene terephthalate, polyamide.

The connection region AB is arranged on a carrier T that can be produced separately. A second line region GCPW2 is further provided on the carrier T.

The carrier T can be made from a material corresponding to the film F or can comprise a different material, such as a rigid board, for example, made of FR4.

The flexible film F has a first contact region C1 and the carrier T has a second contact region C2 for the reciprocal connection of the first line region GCPW1 to the second line region GCPW2.

The flexible film F is routed around one end of the first substrate GS1.

The invention makes it possible to integrate an antenna ANT in a vehicle pane 1 while devices for signal processing, such as filters/amplifiers can be provided near the antenna ANT on a separately producible (rigid) carrier T. By providing suitable contact regions C1, C2, transmission can be done with impedance matching to the respective line regions GCPW1, GCPW2. As a result, the signal-to-noise ratio can be largely maintained. In other words, the invention allows extensive integration while at the same time providing an economical production method.

In one embodiment of the invention, the carrier T is rigid. I.e., the invention can make use of printed circuit boards, for example. Thus, for example, fitting with electronic components EK can be done using conventional technology. This allows economical production of such devices that can be arranged near the antenna ANT such that the attenuation of the useful signal prior to amplification/filtering is minimal. As a result, for example, economical amplifiers can be used.

In another embodiment of the invention, the first contact region C1 and the second contact region C2 have in each case three or more electrical contact points.

As a result, for example, a connection for coplanar waveguides can be provided. For example, a connection of a ground potential can be provided with the outer contact points, while the central contact point provides a connection for the useful signal.

According to another embodiment, the first contact region C1 and the second contact region C2 have, in each case, five (as depicted in FIG. 5) or more electrical contact points. Here, for example, a connection of a ground potential can be provided with the outer contact points, while the central contact point provides a connection for the useful signal. A higher number of contact points can, for example, provide better shielding in the contact region.

According to yet another embodiment of the invention, the film F and the carrier T are—as depicted in FIG. 6—substantially overlappingly arranged in the region of the first contact region C1 and the second contact region C2. Structures that require multiple patterned conductor layers can, for example, be implemented in the overlapping region.

It should be noted that further optional layers are also depicted in the figures.

Also discernible in FIG. 1 is a first substrate GS1 of a vehicle pane 1. If the vehicle pane 1 is provided as a composite pane, a connecting foil VF and a second substrate GS2 can be provided, for example.

The substrate GS1, GS2 preferably contains glass, particularly preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyesters, polyvinyl chloride, and/or mixtures thereof.

FIG. 2 depicts a sectional view through a film F. The film F can have a first electrically conductive layer LS1 and a second electrically conductive layer LS2. By patterning, one (or more) antenna(s) and a first line structure GCPW1 can be provided in these two electrically conductive layers. Optionally, the film can also be equipped with a barrier layer B, e.g., a (flexible) solder stop layer. Likewise, one or a plurality of additional layer(s) ZS can be provided, e.g., a (bonded-on) cover layer. The cover layer can, for example, also be made of a film material.

According to another embodiment of the invention, the (first and/or second) electrically conductive layer has a height $h_{LS1}$, $h_{LS2}$ of 10 μm-75 μm.

This enables a thin assembly that can also be integrated into a composite pane or that can also be adapted to a curved surface.

FIG. 3 depicts a sectional view through a carrier T. The carrier T can have a third electrically conductive layer LS3 and an (optional) fourth electrically conductive layer LS4. By patterning, a connection region AB and the second line structure GCPW2 can be provided in these two electrically conductive layers. Optionally, the carrier T can also be equipped with a barrier layer B, e.g., a (flexible) solder stop layer.

According to another embodiment of the invention, the (third and/or fourth) electrically conductive layer has a height $h_{LS3}$, $h_{LS4}$ of 10 μm-75 μm.

In connection with a likewise thin film F ($h_F$=25 μm . . . 75 μm), this enables a thin arrangement that can also be integrated into a composite pane or that can also be adapted to a curved surface.

In yet another embodiment of the invention, the electrically conductive layers LS1, LS2, LS3, LS4 comprise silver and/or copper and/or gold and/or aluminum and/or indium and/or graphenes. Here, it should be noted that the electrically conductive layers LS1, LS2 can comprise different materials. However, they preferably comprise the same materials. In other words, the conductor structures can be adapted to electrical and/or thermal and/or mechanical boundary conditions.

Without loss of generality, the carrier T can cover the film F on a partial region or on the full region.

While a small overlapping region is advantageous for small sizes, a larger overlapping region can be advantageous for better signal transmission and/or increased mechanical stability. Thus, design options are available to the person skilled in the art such that different needs can be satisfied.

According to another embodiment of the invention, one or a plurality of vias VIA—as indicated in FIG. 4—are arranged at least between one of the lateral conductors L1 and the conductor ground potential plane GP arranged opposite relative to the film F. The vias VIA can be arranged at a predetermined distance from one another. Furthermore, vias VIA can also be provided in an analogous manner relative to the second lateral conductor L2 and the opposite ground potential plane GP. The distance can be based on the wavelength of the signals to be conducted. Furthermore, by means of such vias VIA, the characteristic impedance of the line region GCPW1, GCPW2 can be adapted. In addition, by means of the vias VIA, improved potential equality is achieved over the extent of the arrangement such that the high-frequency properties can be further improved.

Just like the film F, the carrier T can be equipped with such vias VIA, which can perform the same function.

According to yet another embodiment of the invention, the arrangement has—as indicated in FIG. 1—a connection region AB for an electromechanical high-frequency connection element S. In particular, the high-frequency connection element S can have or consist of an SMA socket. The SMA socket can, for example, have an angled arrangement such that a low overall height is provided in the connection area. Typically, vehicle panes are equipped with an electromechanical high-frequency connection element S as built-in part/replacement part to enable quick installation and reliable contacting.

In other words, in contrast to the prior art, the antenna and one or more electronic components can now be brought closer together. As a result, the signal-to-noise ratio can be favorably influenced early on.

In particular, the possibility of using so-called "grounded coplanar waveguides" for the line regions GCPW1, GCPW2 permits low-interference and/or low-loss transmission.

According to another embodiment of the invention, a vehicle with a glass pane 1 according to the invention, in particular a land, water, air, or space craft, is provided.

According to yet another embodiment of the invention, the glass pane 1 according to the invention is used to receive signals for satellite-based navigation, in particular to receive GNSS signals of Navstar GPS, Galileo, GLONASS, BeiDou, NaviC, QZSS. Alternatively or additionally, the glass pane 1 according to the invention is used to receive signals of a mobile communication system, in particular of a 2G, 3G, 4G, or 5G mobile communication system.

In otherwords, by means of the invention, the integration of antennas for satellite navigation is, in particular, enabled. The amplifier can be arranged near the antenna. The antenna or the antennas can be arranged between substrates GS1, GS2 of a composite glass pane 1. Since the antenna(s) ANT can be arranged on a flexible film F, the antenna ANT can adapt to a curvature of the vehicle pane. By means of the flexible film F, a line structure can be provided, for example, as a (grounded) coplanar waveguide, GCPW1. Since the film F is flexible, the film can, for example, be routed around one end of a substrate GS1.

The electronics for an amplifier and/or filter can be provided on a carrier T that can be produced separately.

The carrier T and the film F can be provided as an integrated element—as depicted in FIG. 6—or via contact elements as depicted in FIG. 5.

In the example of FIG. 6, it is possible, for example, to provide a via VIA from one electrically conductive layer LS3 all the way to the electrically conductive layer LS1. Thus, the via VIA provides a contact region C1/C2.

Thus, the high-frequency portion can be implemented without substantial geometric changes such that the impedance remains substantially unchanged.

The connection region AB can also be designed as a contact region C1/C2 (e.g., as depicted in FIG. 5).

LIST OF REFERENCE CHARACTERS

1 vehicle pane
GS1, GS2 substrate
F flexible film
T carrier
EK electrical component
LS1, LS2 electrically conductive layer
LS3, LS4 electrically conductive layer
ANT antenna structure
GCPW1 line structure
GCPW2 line structure
$h_{LS1}$ $h_{LS2}$ height
$h_{LS3}$ $h_{LS4}$ height
VIA via
VF connecting foil
AB connection region
S connector
C1, C2 contact region
B barrier layer
ZS additional layer(s)
L1, L2 conductor tracks
ML middle track (useful signal)
GP ground potential plane

The invention claimed is:

1. A vehicle pane comprising a first substrate, at least one antenna structure and a connection region, wherein the antenna structure is arranged on a flexible film, wherein, additionally, a first line region is provided on the flexible film, wherein the connection region is arranged on a carrier, wherein, additionally, a second line region is provided on the carrier, wherein the flexible film has a first contact region and the carrier has a second contact region for a reciprocal connection of the first line region to the second line region, wherein the flexible film is routed around one end of the first substrate, wherein the first line region is designed as a grounded coplanar waveguide.

2. The vehicle pane according to claim 1, wherein the carrier is rigid.

3. The vehicle pane according to claim 1, wherein the first contact region and the second contact region each have three or more electrical contact points.

4. The vehicle pane according to claim 1, wherein the first contact region and the second contact region each have five or more electrical contact points.

5. The vehicle pane according to claim 1, wherein the flexible film and the carrier are arranged substantially overlappingly in the region of the first contact region and the second contact region.

6. The vehicle pane according to claim 1, wherein the flexible film has a first patterned conductor layer and a second patterned conductor layer.

7. The vehicle pane according to claim 6, wherein the flexible film has at least one via.

8. Vehicle pane according to claim 1, wherein the flexible film comprises polyimide.

9. The vehicle pane according to claim 1, wherein the carrier comprises FR4.

10. The vehicle pane according to claim 1, wherein the carrier has at least one via.

11. The vehicle pane according to claim 1, wherein the antenna structure is designed to receive high-frequency signals.

12. A method comprising receiving signals for satellite-based navigation with the vehicle pane according to claim 1.

13. The method according to claim 12, wherein the signals are GNSS signals of Navstar GPS, Galileo, GLONASS, BeiDou, NaviC, or QZSS.

* * * * *